INVENTORS
JAMES L. COLLINS
EDWARD J. COLLINS
BY
Lyon & Lyon
ATTORNEYS

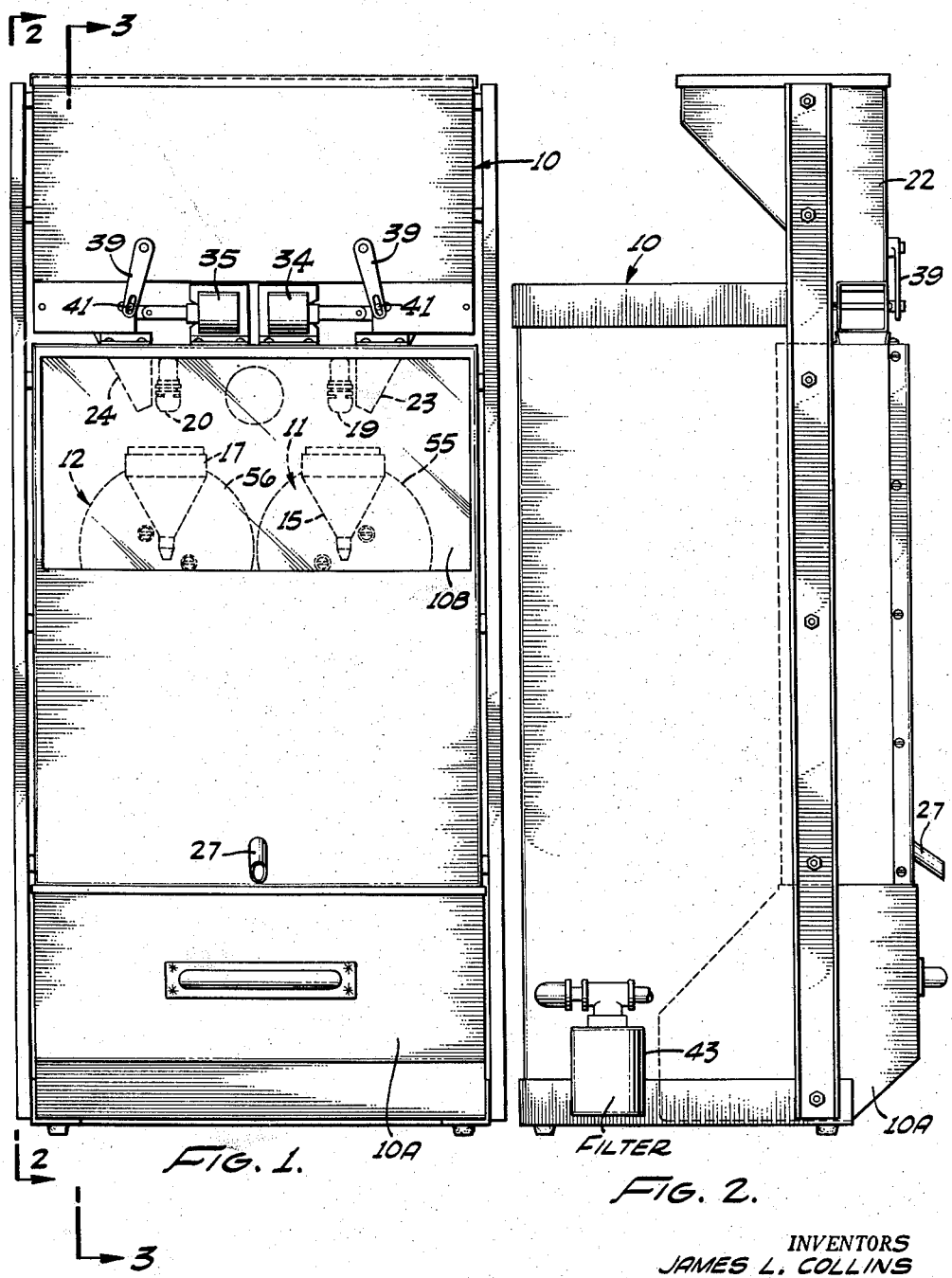

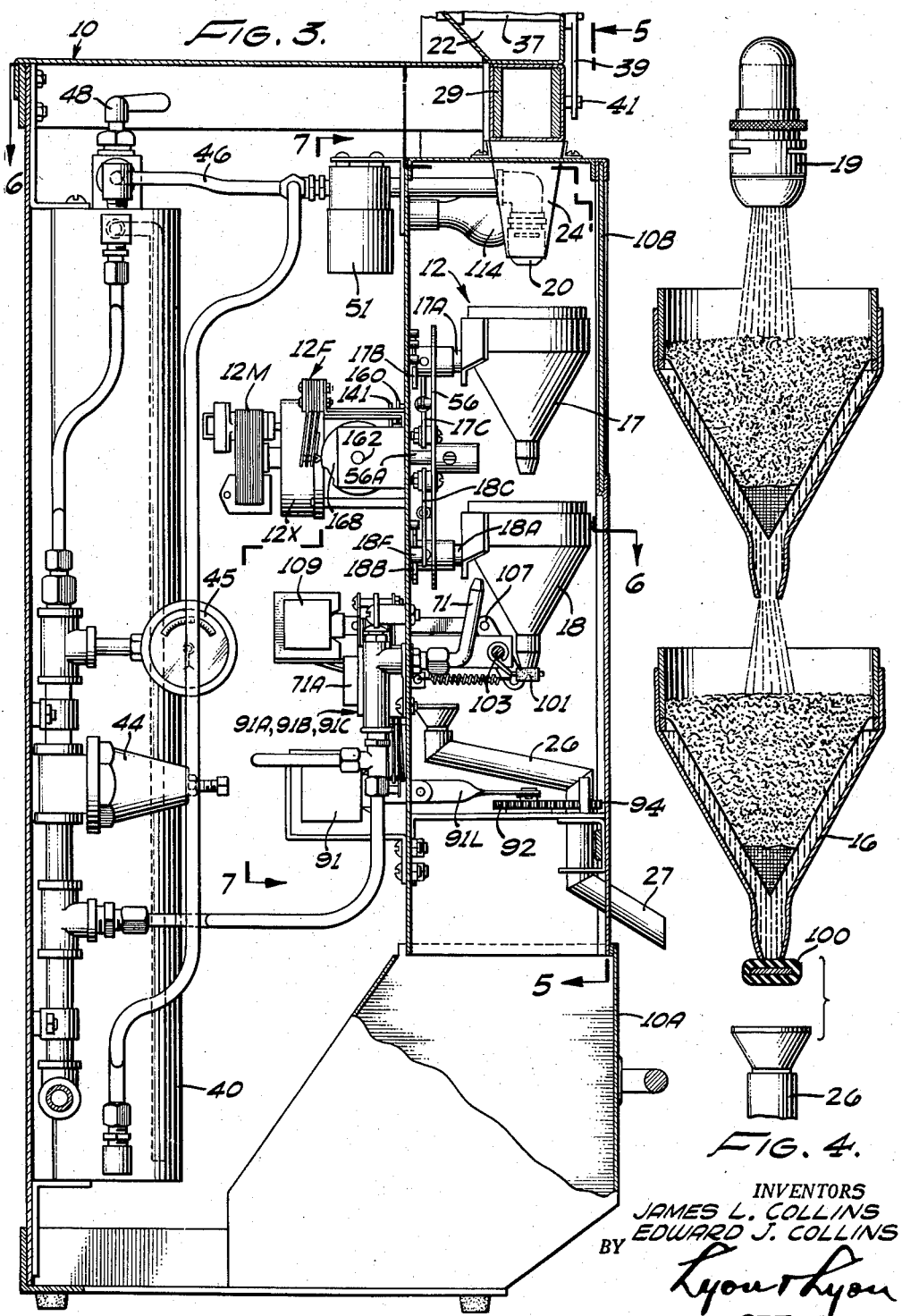

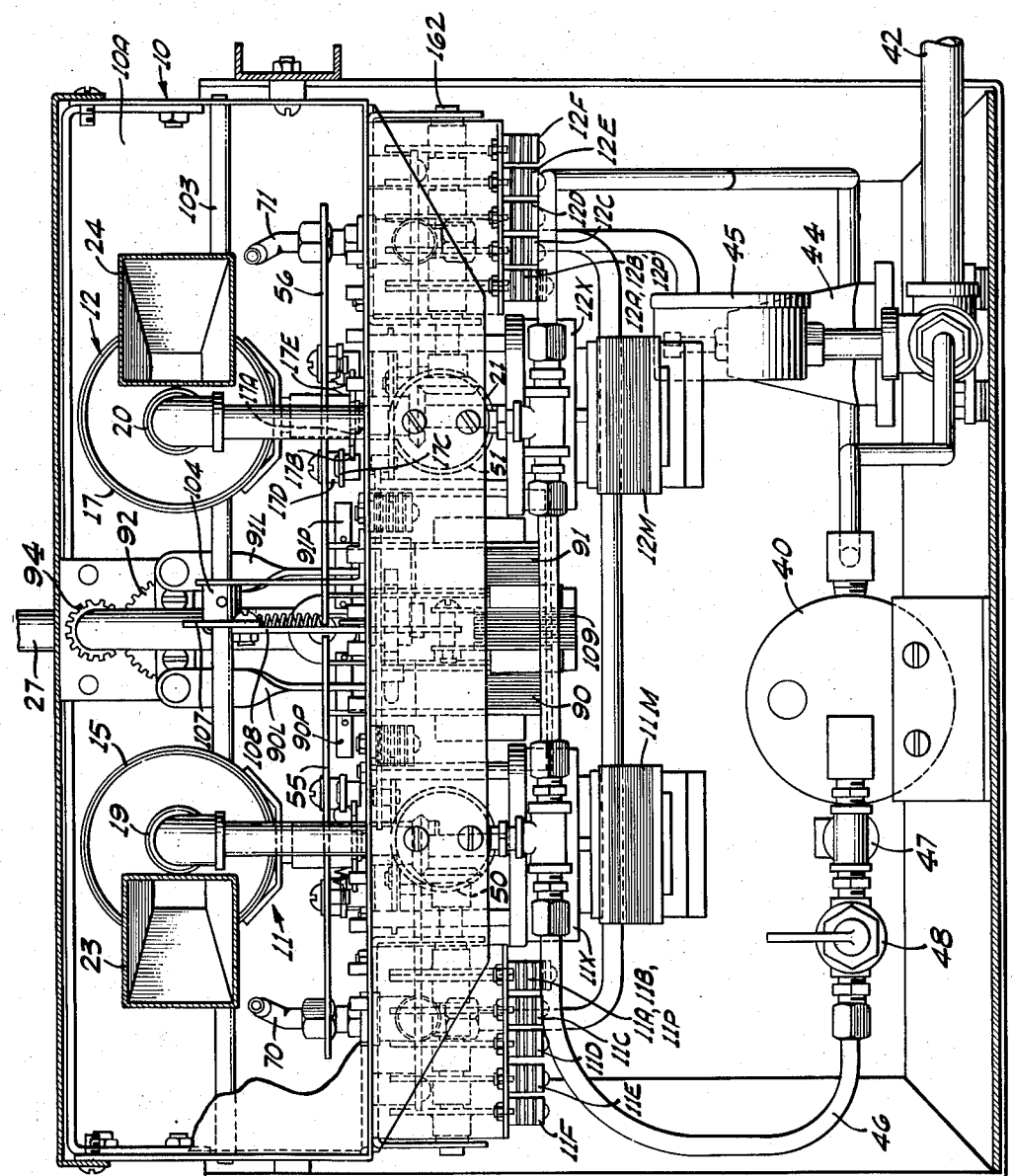

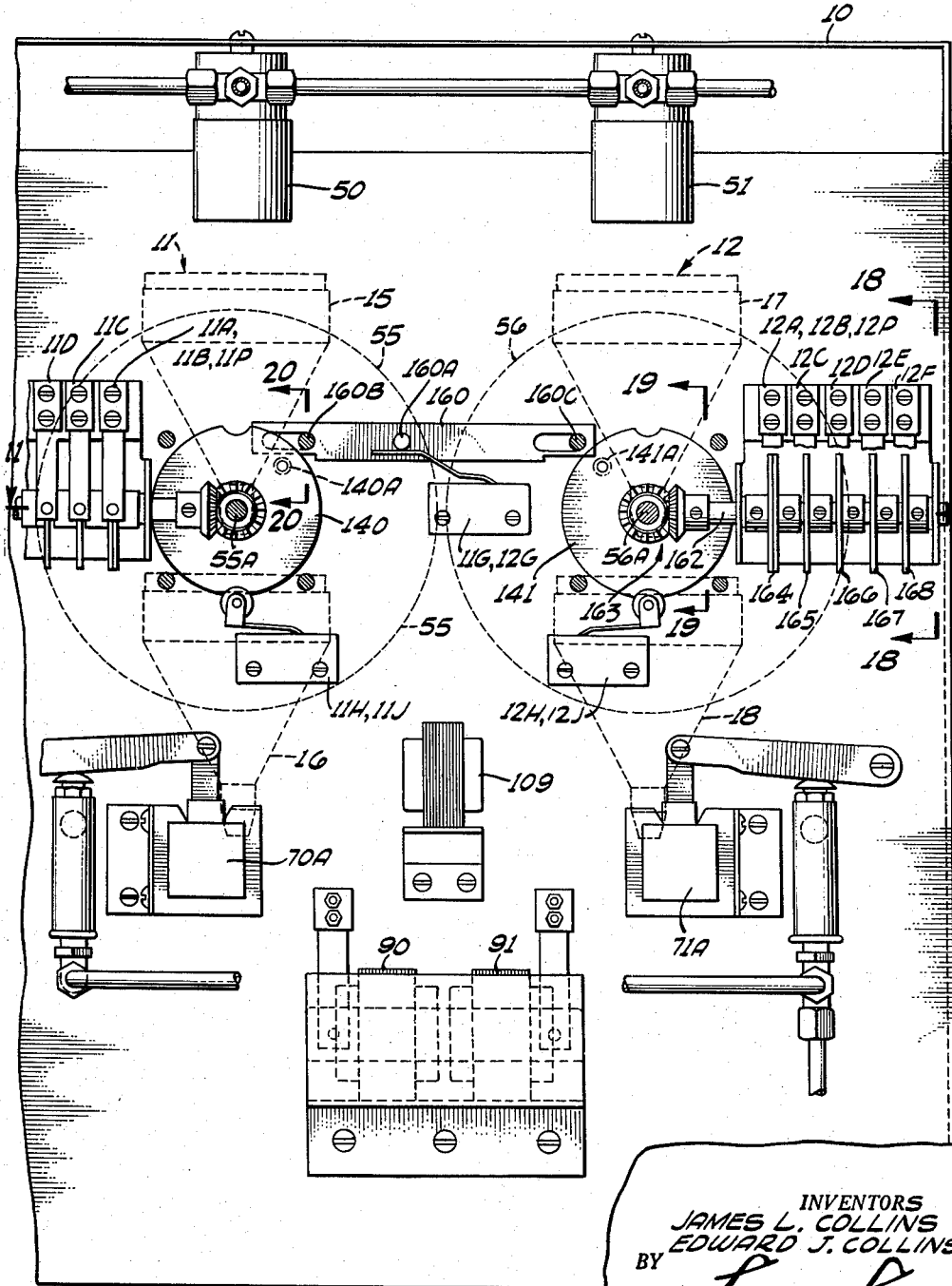

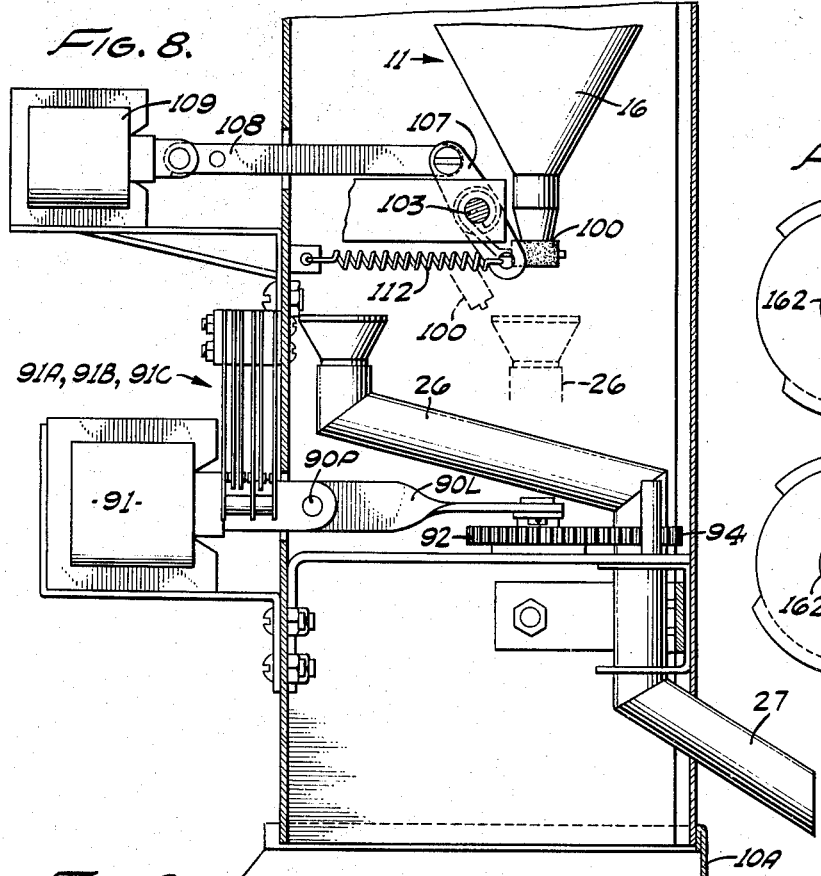
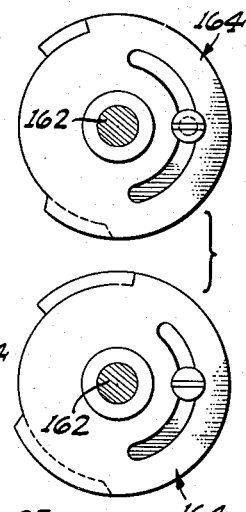
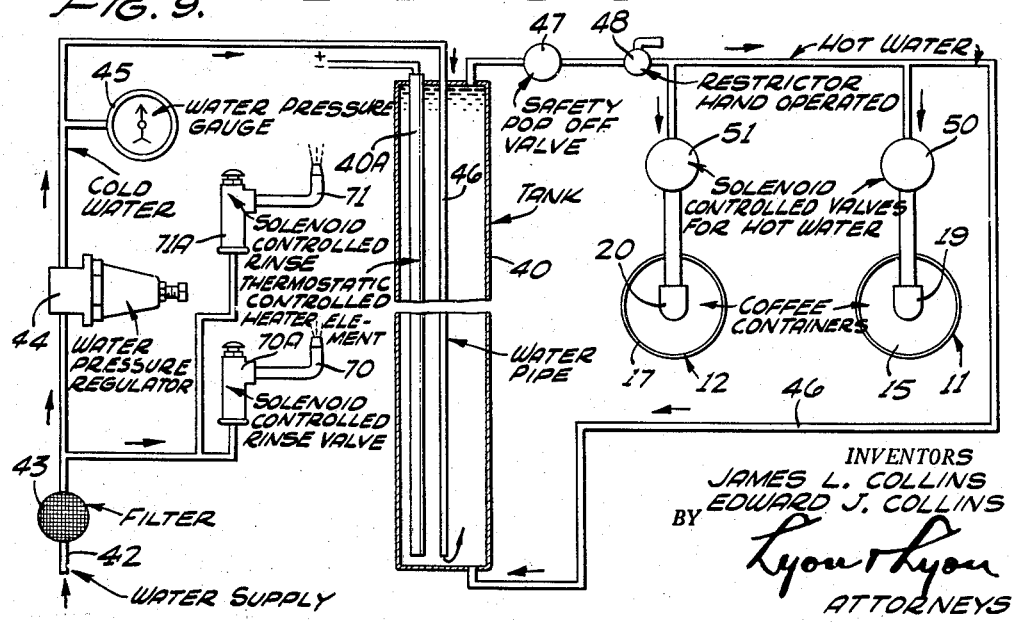

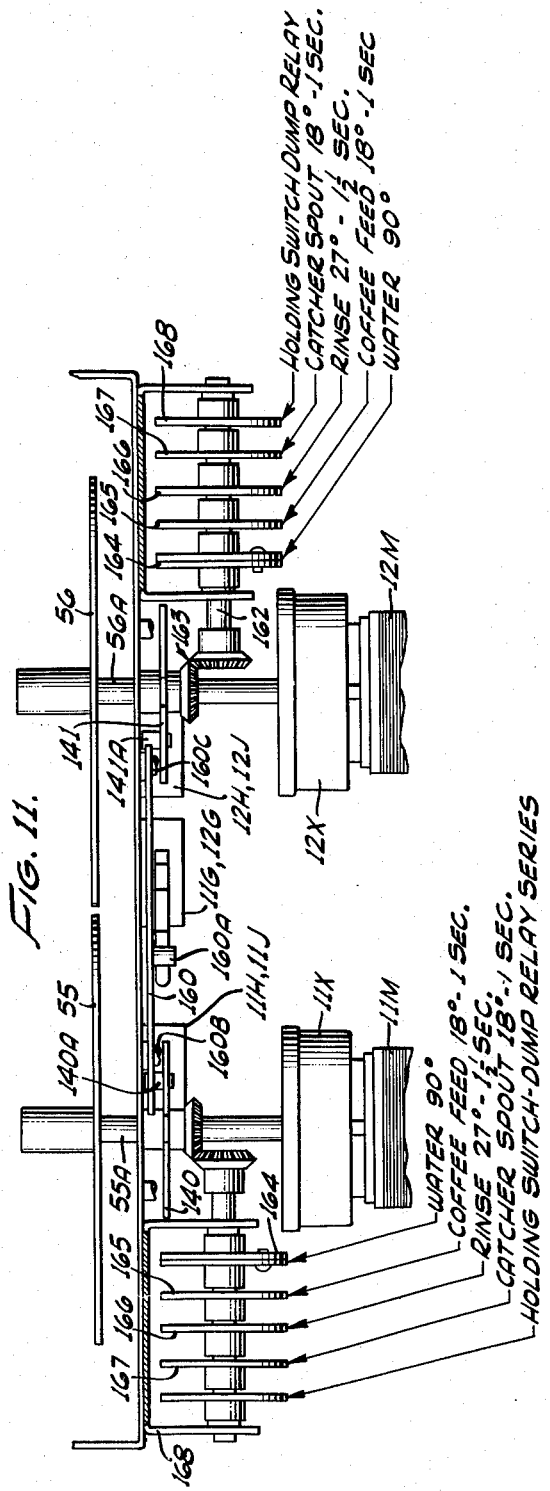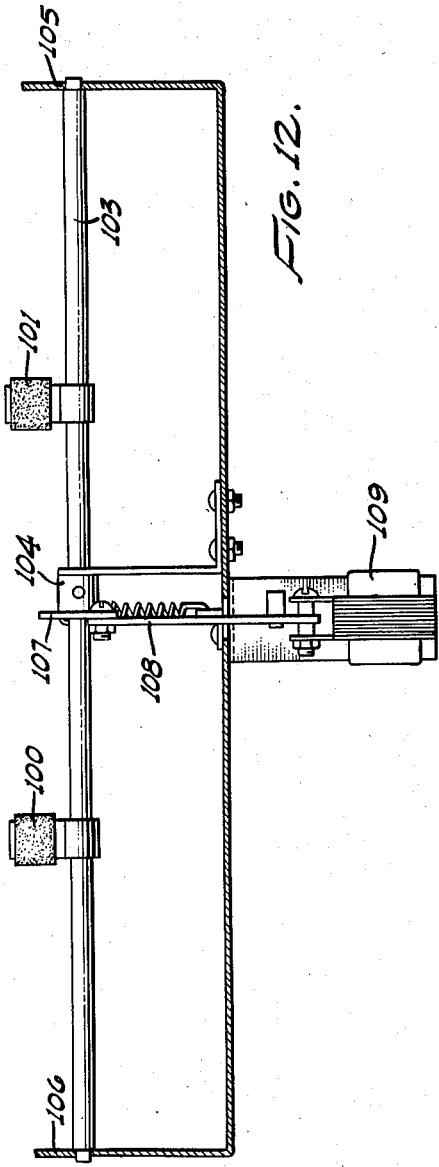

Oct. 11, 1960    J. L. COLLINS ET AL    2,955,527
COFFEE MAKER AND DISPENSER
Filed July 16, 1956    13 Sheets-Sheet 8

INVENTORS
JAMES L. COLLINS
EDWARD J. COLLINS
BY Lyon & Lyon
ATTORNEYS

Oct. 11, 1960  J. L. COLLINS ET AL  2,955,527
COFFEE MAKER AND DISPENSER
Filed July 16, 1956  13 Sheets-Sheet 9

INVENTORS
JAMES L. COLLINS
EDWARD J. COLLINS
BY
Lyon & Lyon
ATTORNEYS

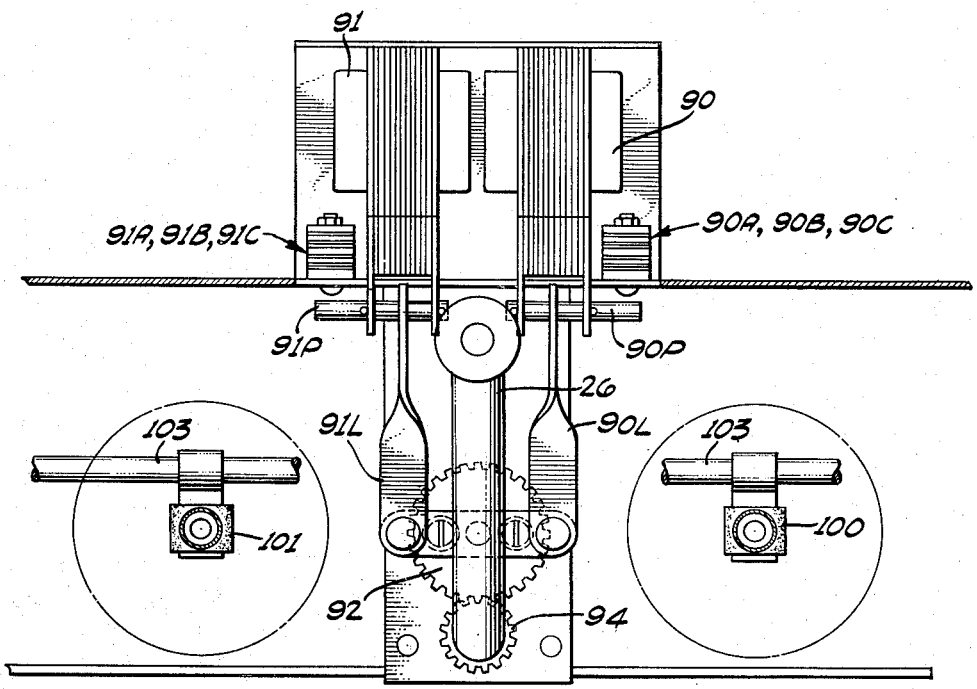
FIG. 22.
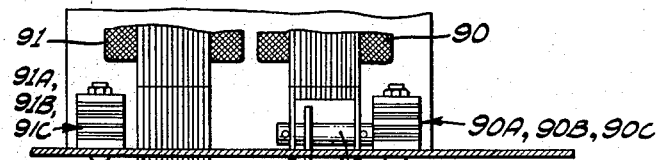
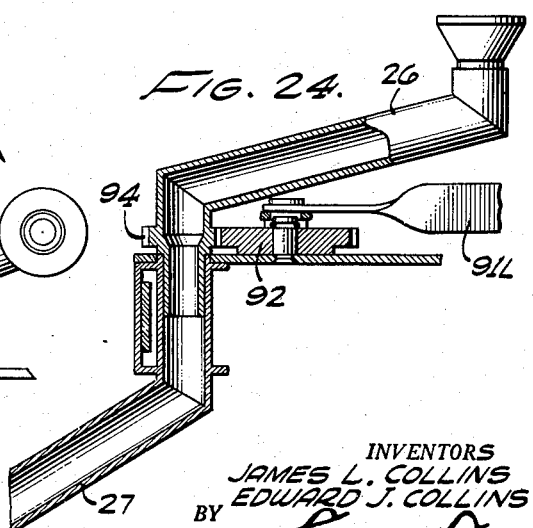
FIG. 24.
FIG. 23.
INVENTORS
JAMES L. COLLINS
EDWARD J. COLLINS
BY
Lyon & Lyon
ATTORNEYS Oct. 11, 1960    J. L. COLLINS ET AL    2,955,527
COFFEE MAKER AND DISPENSER
Filed July 16, 1956    13 Sheets-Sheet 11

POSITION #1 & #12

POS #2

POS. #3.

POS #4

POS #5

POS #6

INVENTORS
JAMES L. COLLINS
EDWARD J. COLLINS
BY Lyon & Lyon
ATTORNEYS

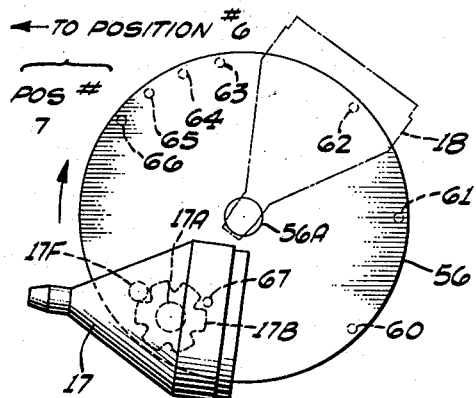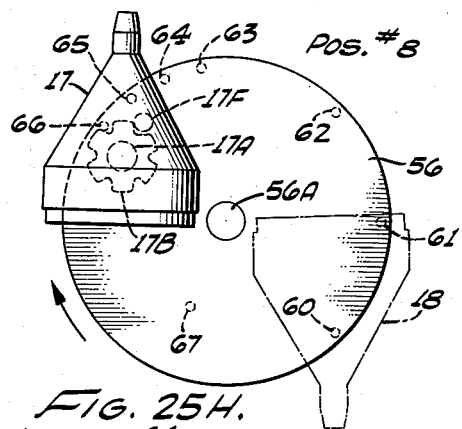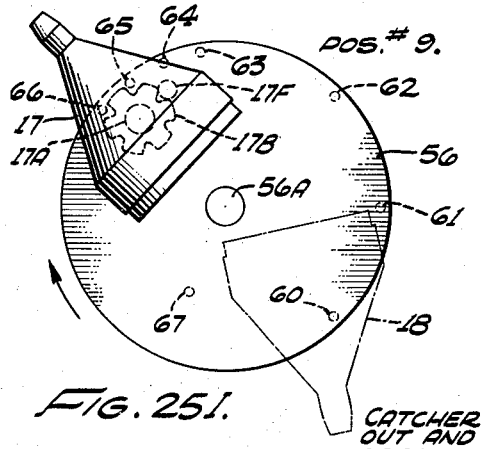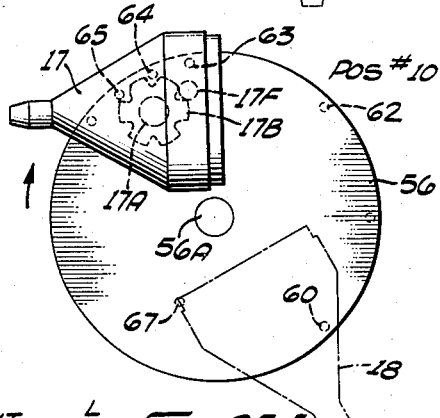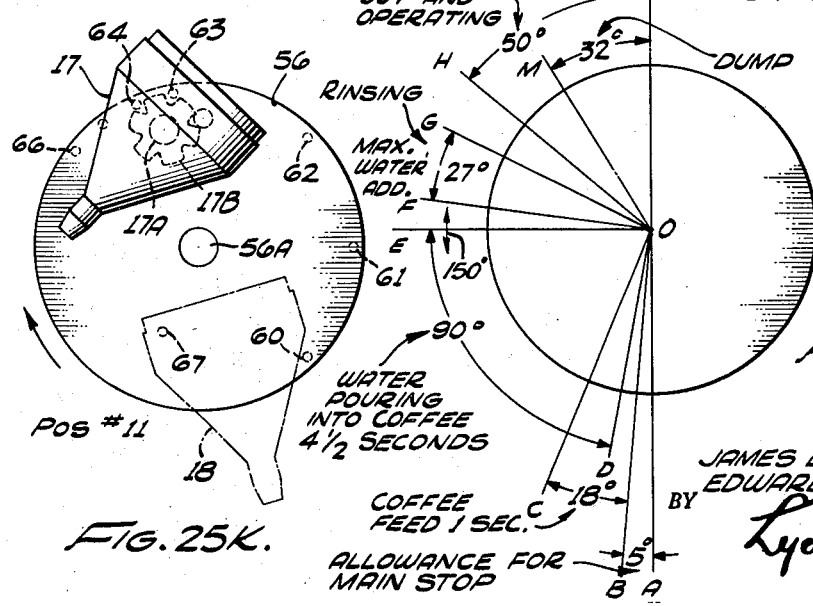

INVENTORS
JAMES L. COLLINS
EDWARD J. COLLINS
BY
ATTORNEYS

United States Patent Office 2,955,527
Patented Oct. 11, 1960

2,955,527

COFFEE MAKER AND DISPENSER

James Lee Collins, Los Angeles, and Edward James Collins, Beverly Hills, Calif., assignors to O. A. Turman, Woodland Hills, Calif.

Filed July 16, 1956, Ser. No. 597,902

11 Claims. (Cl. 99—283)

The present invention relates to improved means and techniques embodied in beverage dispensers, and more specifically to makers and dispensers of hot prepared coffee.

Briefly, the arrangement disclosed herein is an automatic machine for making and dispensing coffee which is prepared from ground coffee beans and hot water. The ground coffee is automatically dispensed in metered amounts into a funnel-shaped container. A controlled amount of hot water flows by gravity through two of such filled containers in succession, wherein seepage and coffee flavor extraction occurs, after which the prepared coffee flows into a dispensing spout. An upper and a lower ground coffee container is provided for this purpose and such containers are movable so that the first one and then the other container is the upper container. A metered amount of ground coffee is dispensed only into the upper container. The amount of water which is allowed to flow in one cycle of operation corresponds to a standard cup. After completion of a cycle, the ground coffee containers are interchanged in position, i.e., the upper container is moved to a lower position and the lower container is moved to an upper aligned position. In such movement of the upper cup to its lower position, the ground coffee is not distributed; but in movement of the lower container to its upper position, the ground coffee is dumped from the same and such container is also automatically rinsed so as to condition the same for reception of a metered amount of fresh ground coffee at the time such container reaches its upper position. This means that the ground coffee dispensed into any one particular container is used in two successive cycles, i.e., in the production of two successive cups of coffee. The metering out of the ground coffee, the flow of hot water through the ground coffee containers, movement of the cups are all accomplished automatically and in synchronized relation by an electrical control system involving motors, relays, and automatically operated switching means.

A general object of the present invention is to provide an improved coffee making machine which produces a clear cup of prepared hot coffee from ground coffee beans.

Another object of the present invention is to provide an improved machine having the features indicated above.

A specific object of the present invention is to provide an improved coffee dispensing machine in which there is an efficient seepage or percolation of hot water through ground coffee beans.

Another object of the present invention is to provide an improved machine of this character in which the user is able to see that the coffee which he purchases is prepared from ground coffee beans.

Another object of the present invention is to provide an improved machine of this character which is relatively simple considering the various functions which it performs.

Another object of the present invention is to provide an improved machine of this character for producing a clear cup of prepared coffee from ground coffee beans.

Another object of the present invention is to provide an improved machine of this character which automatically produces a cup of coffee in a relatively short time.

Another object of the present invention is to provide an improved machine of this character which incorporates generally two sets of ground coffee containers, with each set being operated alternately in such a manner that while one set has hot water running therethrough for extracting coffee flavor from the ground coffee, the other set is being conditioned for use in the next operating cycle.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings, in which:

Figure 1 is a view in front elevation of the coffee preparing and dispensing machine embodying features of the present invention.

Figure 2 is a side view of the machine illustrated in Figure 1, taken in the direction indicated by the arrows 2—2 in Figure 1.

Figure 3 is a sectional view taken generally on the line 3—3 of Figure 1.

Figure 4 is a view illustrating the manner in which a controlled amount of hot water flows by gravity through two vertically aligned ground coffee containers.

Figure 5:
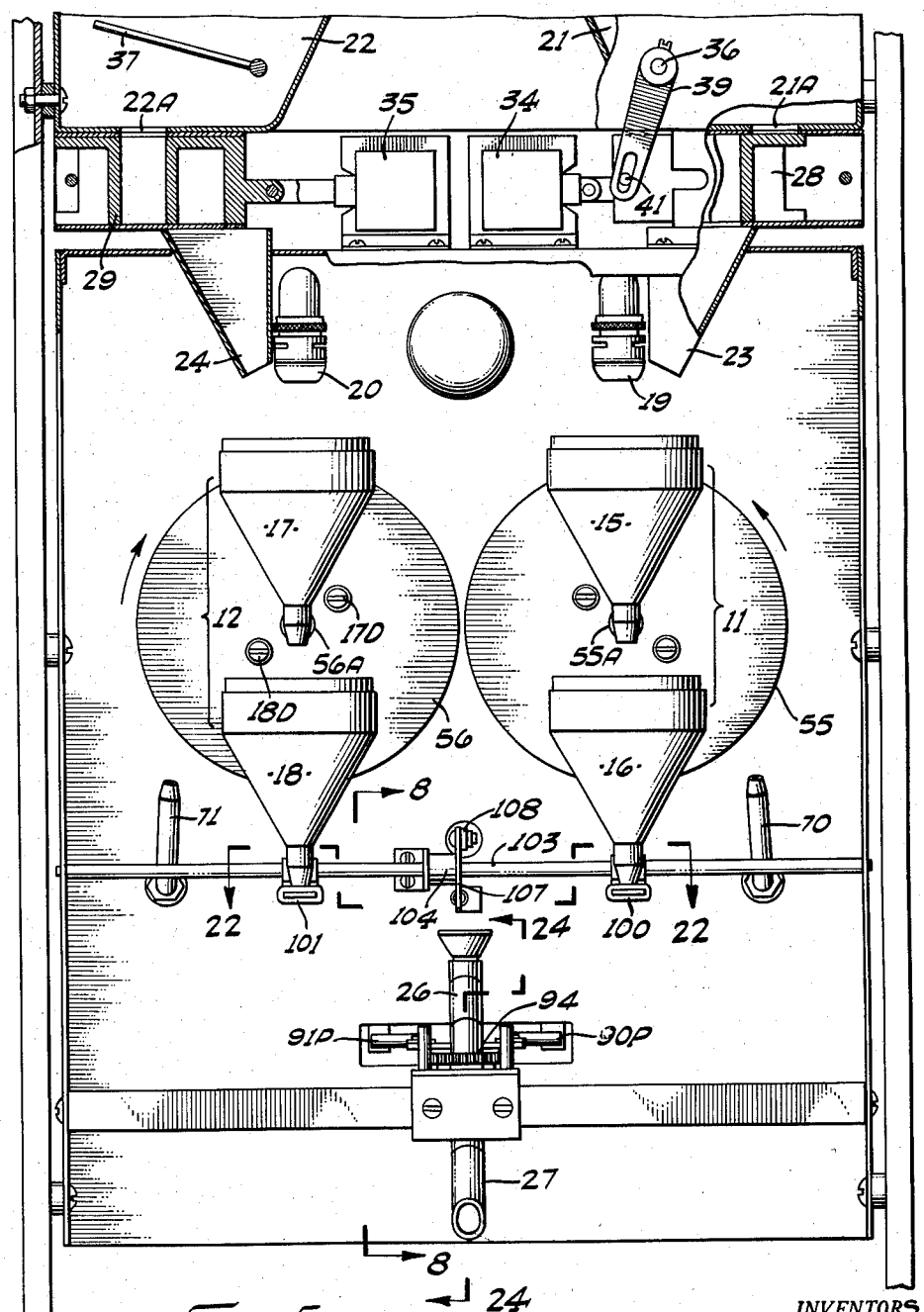

Figures 5, 6 and 7 are sectional views taken generally on the corresponding lines 5—5, 6—6 and 7—7 in Figure 3.

Figure 8 is a sectional view taken generally on the line 8—8 of Figure 5.

Figure 9 is a diagrammatic view illustrating the flow and control of water in the machine illustrated in Figure 1.

Figure 10 illustrates the adjustable water controlling cams used in the machine illustrated in Figure 1.

Figure 11 is an incomplete sectional view taken generally on the line 11—11 of Figure 7.

Figure 12 illustrates operating mechanism for the pair of stoppers associated with the bottom funnels.

Figure 13:
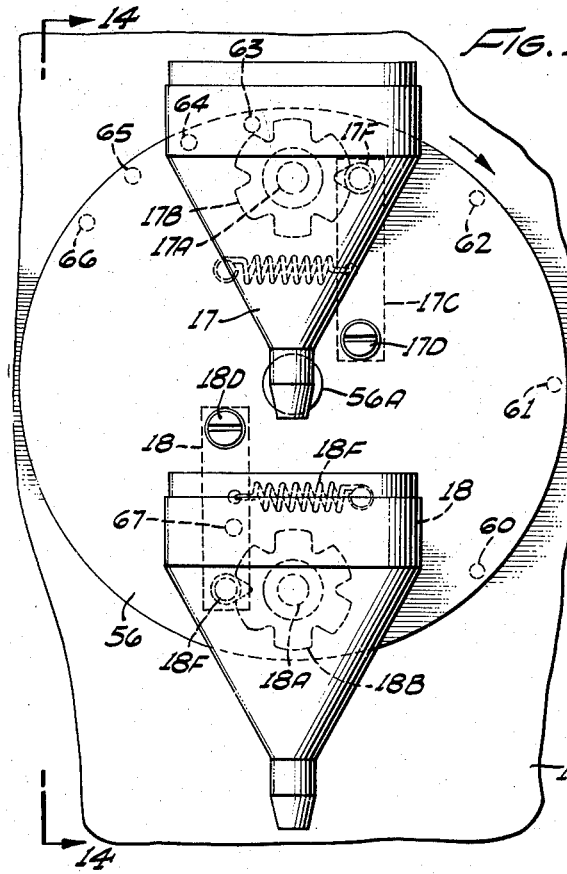

Figure 13 shows, in enlarged form and in greater detail, mechanism associated with the ground coffee containers.

Figure 14:
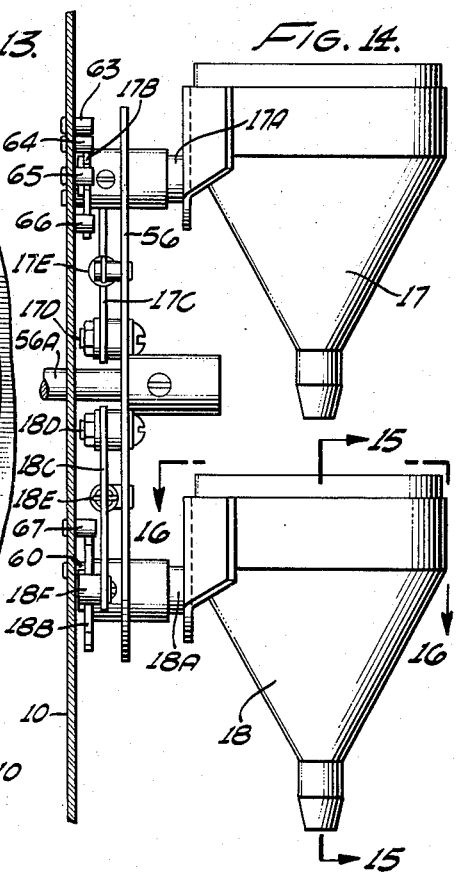

Figure 14 is a sectional view taken generally on the line 14—14 of Figure 13.

Figure 15:
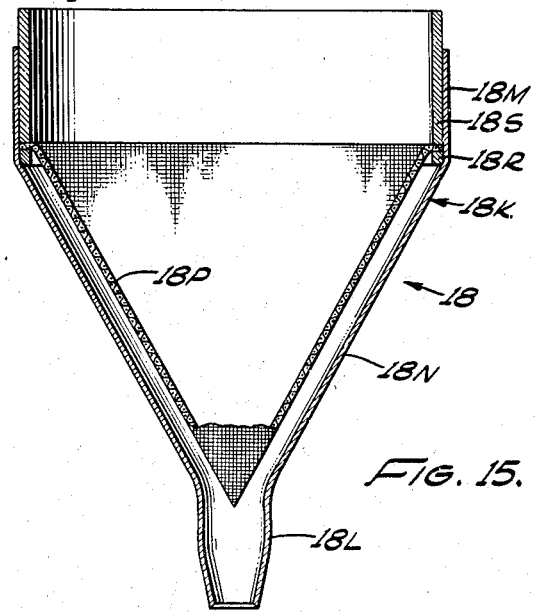
Figure 16:
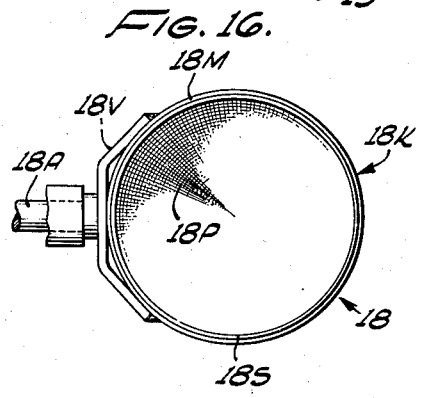

Figures 15 and 16 are sectional views taken generally on the lines 15—15 and 16—16 of Figure 14.

Figure 17:
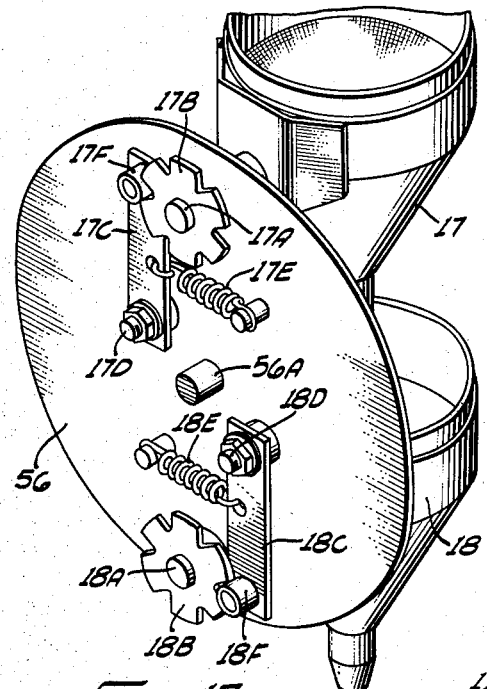

Figure 17 is a perspective view illustrating the ground coffee containers and a portion of the mechanism used to orient the individual containers as they are moved from an upper position to a lower position, and vice versa.

Figure 18:
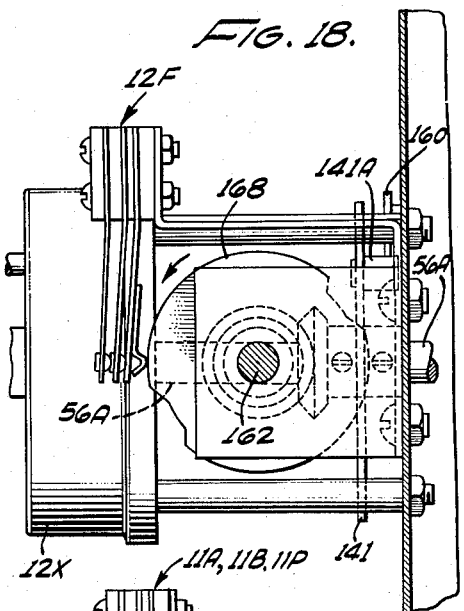
Figure 20:
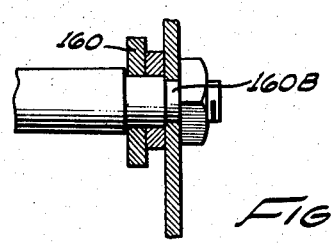
Figure 19:
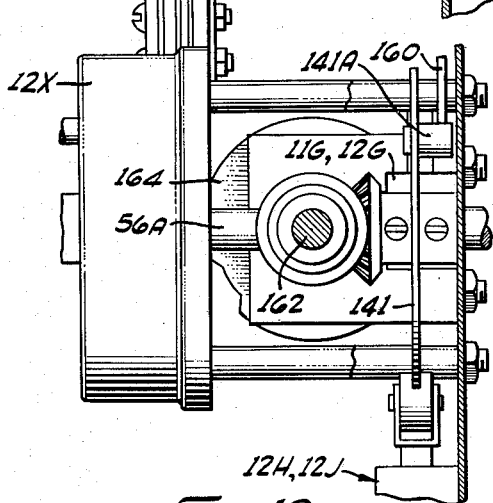

Figures 18, 19 and 20 are sectional views taken generally on corresponding lines 18—18, 19—19 and 20—20 in Figure 7.

Figure 21:
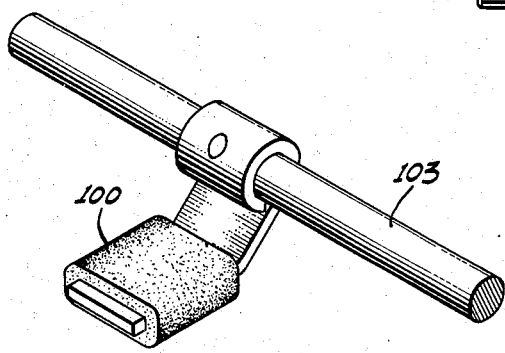
Figure 25A:
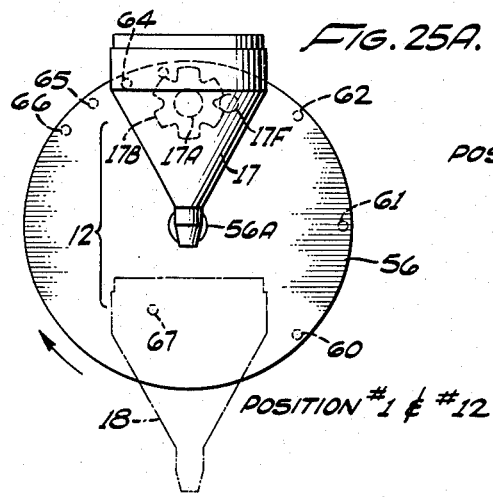
Figure 25B:
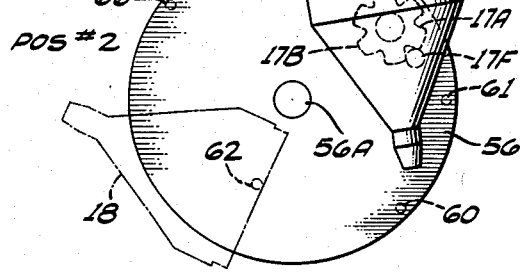
Figure 25C:
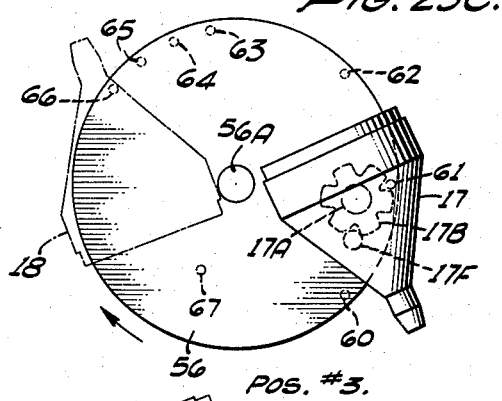
Figure 25D:
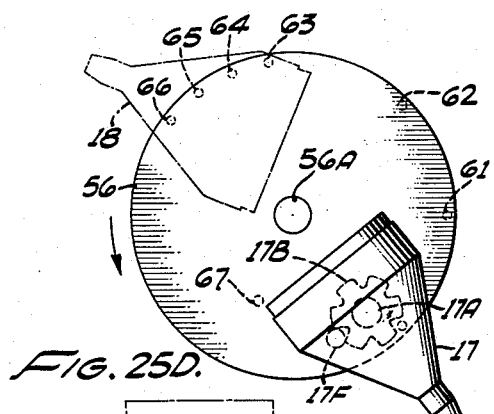
Figure 25E:
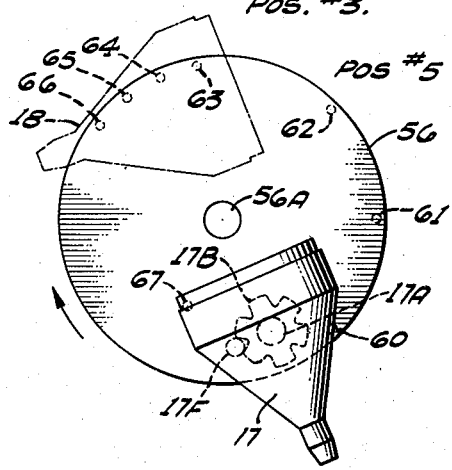
Figure 25F:
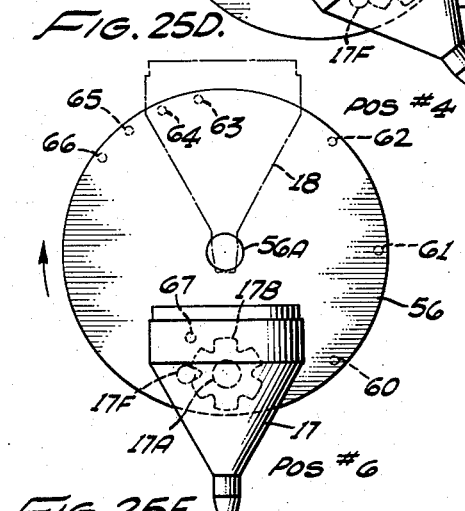

Figure 21 is a perspective view illustrating in more detail the construction and mounting of the stoppers associated with the lower ground coffee container.

Figure 22 is a sectional view taken generally on the line 22—22 of Figure 5.

Figure 23 is a view corresponding to Figure 22, but with parts shown in different operating position.

Figure 24 is a sectional view taken on the line 24—24 of Figure 5.

Figures 25A–K comprise essentially one figure, namely, Figure 25, and serve to illustrate successive positions in that order which the ground coffee containers assume during one complete rotation of the disc on which the containers are carried.

Figure 26 is a diagrammatic view illustrating the timing of various functions in operation of the machine illustrated in Figure 1.

Figure 27:
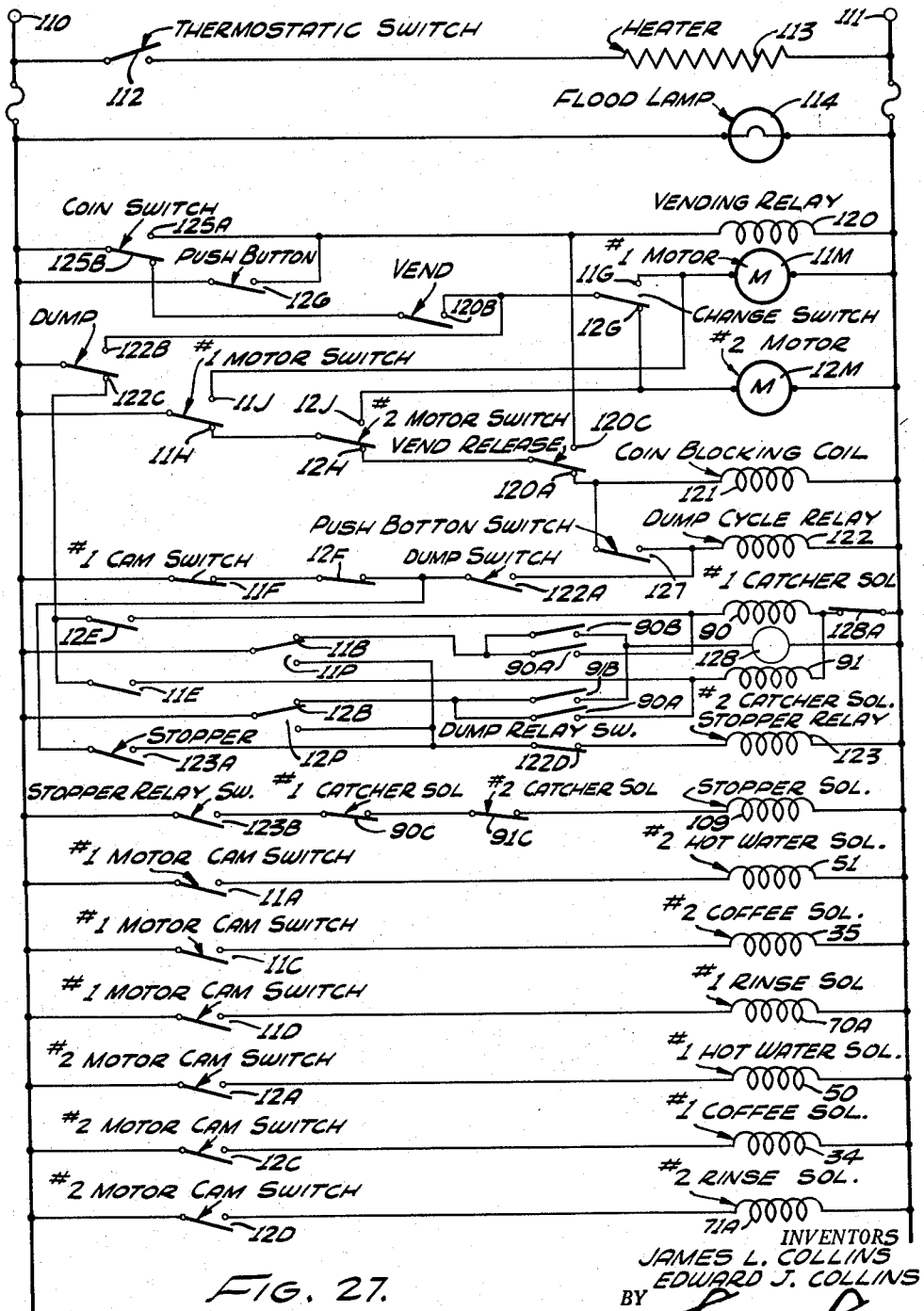

Figure 27 is a schematic diagram of the electrical apparatus incorporated in the machine shown in Figure 1.

The machine is mounted in a cabinet or housing 10 and includes two sets of funnel-shaped ground coffee containers, one set being identified by the general reference numeral 11 in Figure 5, while the other set is identified by the reference numeral 12. Each funnel-shaped ground coffee container is of identical construction and are identified, for convenience, by separate reference numerals 15, 16, 17 and 18. While one set, for example set 11, has hot water running therethrough in preparation of a cup of coffee, the other set 12 is being conditioned for use in preparation of the next cup of coffee.

The hot water for set 11 flows from the hot water outlet 19 and, similarly, the hot water outlet 20 serves to supply hot water to the set 12 when such set is in use.

Ground coffee is stored in the individual hoppers 21 and 22 from where it is automatically dispensed in metered amounts via corresponding chutes 23 and 24 into the uppermost container of the corresponding sets 11 and 12.

The hot water, after conversion into coffee, is allowed to gravitate into the automatically positioned conduit 26 which is automatically positioned to receive such coffee from either set 11 or set 12, as the case may be, so that the coffee may gravitate out of the connecting spout 27 (Figure 24) into the purchaser's or user's cup.

It is contemplated that the machine may incorporate conventional automatic cup dispensing means so as to dispense individual cups for reception of the coffee leaving the outlet spout 27, although the provision of cup dispensing means is considered optional in that the machine may be used by a restaurant owner, who would then manually position the cups under the outlet spout 27. Further, it is contemplated, as illustrated later in connection with Figure 27, that the machine may be coin-operated; but this again is optional and provisions are made to allow, for example, a restaurant owner to operate the machine without coins, i.e., by operating switches such as push-button switches.

Ground coffee dispensing means

The ground coffee is stored in quantities in hoppers 21 and 22 which are secured to the housing or frame 10. These hoppers 21 and 22 each has a corresponding outlet opening 21A, 22A (Figure 5) through which the stored ground coffee may gravitate into cylindrical open-ended metering containers 28 and 29. These metering containers 28 and 29 are slideably mounted on the frame 10 between parallel spaced stationary walls, so that the open ends of the metering containers 28 and 29 may be brought into registry either with the corresponding opening 21A, 22A or the corresponding chutes 23 and 24. These metering containers 28 and 29 are movable from a ground coffee receiving position to a ground coffee dispensing position by corresponding solenoids 35, 34, which are electrically connected in the circuitry illustrated in Figure 27 for sequential operation and as described later.

Preferably, to assure dispensing of uniform metered quantities of ground coffee, a lever system which includes a lever 36, 37 in corresponding hoppers 21, 22 is operated upon energization of the corresponding solenoids 34 and 35. Each lever system is of identical construction and involves generally a slotted arm 39 having its slotted portion engageable with a pin 41 carried on a corresponding member 28, 29 in such a manner that the lever system is thus pivoted about the axis of the lever shaft which, as illustrated in Figure 3, is pivotally mounted in the side walls of the corresponding hoppers 21 and 22.

It is understood that ground coffee is dispensed alternately from the hoppers 21 and 22 to the corresponding funnel sets 11 and 12. In the normal deenergized position of the solenoids 34 and 35, the metering containers 28 and 29 are positioned in alignment with the hopper openings 21A and 22A to receive ground coffee from such hoppers. When either solenoid 34 or 35, as the case may be, is energized, the corresponding meter containers 28 and 29 are moved inwardly toward the corresponding solenoid, so that the metered amount of coffee may gravitate into the corresponding hopper 23 or 24, as the case may be.

Hot water and rinse water control system

As indicated previously, hot water for coffee making purposes is alternately dispensed in controlled amounts from the nozzles 19 and 20 which are positioned above the corresponding ground coffee container sets 11 and 12 (Figure 5). These nozzles 19 and 20 receive water from the hot water system illustrated in schematic form in Figure 9. In Figure 9 a hot water heating tank 40 receives a supply of cold water from the water main 42 through the filter 43 and pressure regulator 44. A pressure gauge 45 may be provided to indicate the pressure of the water in tank 40. The water is heated by a thermostatically controlled electric heating element 40A within tank 40.

Hot water from tank 40 flows continuously from the top of tank 40 to the bottom of tank 40 through conduit means 46 which includes therein a safety popoff valve 47 and an adjustable flow regulating or restrictor valve 48. By providing such conduit means 46, a substantially instantaneous flow of hot water is assured to the outlet nozzles or spouts 19 and 20 when the corresponding solenoid valve 50 or 51, as the case may be, is operated. These valves 50 and 51 are normally closed, i.e., the flow of hot water is normally prevented, but such hot water flow takes place when the corresponding solenoid valve 50 or 51 is electrically operated, as described later in connection with the electrical circuitry shown in Figure 27.

Preferably, the spouts 19 and 20, as illustrated in Figure 5, are of the so-called aerating type which produces a smooth flow of aerated hot water so as to minimize splashing when the hot water falls onto the ground coffee in the ground coffee container set 11 or 12, as the case may be.

The rinse water is ejected through nozzles 70 and 71 and the flow of rinse water, which is cold water, is controlled by the corresponding solenoid valves 70A and 71A.

Movement of funnel-shaped ground coffee containers during an operating cycle As indicated previously, while coffee is being made using one set of ground coffee containers 11 or 12, as the case may be, the other set of containers is being conditioned for use in making the next cup of coffee.

Thus, while coffee is being made using the container set 11, the containers 15 and 16, comprising the set 11, remain stationary, while the containers 17 and 18, comprising the set 12, move and are being conditioned for subsequent use. It is understood that movement of the funnel-shaped containers 17 and 18, as described in connection with Figures 25A–25K, serves also as a description of the manner in which the other funnel-shaped cup members 15 and 16 are moved when they are being conditioned for subsequent use.

The container sets 11 and 12 are mounted for rotation on the individual rotatable discs 55 and 56. The disc 55 is rotatable by the motor 11M and the disc 56 is rotatable by the motor 12M. These motors are alternately energized by the control circuit described later in connection with Figure 27. These discs 55 and 56 are supported on corresponding shafts 55A and 56A which are journalled for rotation on the frame 10.

Each ground coffee container in turn is rotatably mounted on its corresponding disc 55 or 56 as the case may be, as illustrated in Figure 17.

Thus, the funnel-shaped containers 17 and 18 have a shaft 17A, 18A extending therefrom, with such shafts being journalled for rotation in the disc 56. These shafts 17A and 18A have secured thereto a Geneva type of wheel 17B, 18B which are held in indexed position by a corresponding spring biased arm 17C, 18C. The arms 17C and 18C are pivotally mounted on corresponding supporting posts 17D, 18D and are biased by tension springs 17E, 18E, so that pins 17F, 18F normally engage an apertured portion of the notched wheels 17B, 18B so as to hold the corresponding ground coffee containers 17 and 18 in indexed position, subject, however, to movement by a mechanism now described.

The notched wheels 17B and 18B cooperate with a series of circumferentially spaced stationary pins 60, 61, 62, 63, 64, 65, 66 and 67 (Figures 13 and 14) mounted on the stationary support or housing 10. This series of pins are engageable with notched portions of the notched wheel 17B and 18B when and as the disc 56 is rotated about the axis of the shaft 56A (Figure 17) in such a manner that the funnel-shaped ground coffee containers 17 and 18 assume the successive positions illustrated in Figures 25A–25K.

In general, it is noted that Figures 25A–25F illustrate the sequence of events during one-half of a revolution of the disc 56, while Figures 25G–25K illustrate successive positions assumed during the next succeeding half revolution of disc 56. It is understood that one cycle of operation corresponds to a half revolution of disc 56 and consists of movement of the uppermost container 17 to a vertically aligned position under container 18.

It is noted in connection with Figures 25A–25F that the container 17, in its movement from its uppermost position to its lowermost position, is such that the ground coffee contained therein (and previously used in making coffee) is not appreciably disturbed, whereas, on the other hand, container 18 is moved such that the ground coffee therein may gravitate or be dumped therefrom.

Thus, the purpose of the stationary pins 62, 61 and 60 cooperating with the notched wheel 17B is to move the funnel-shaped container 17 so that it remains substantially in an upright position. This is accomplished generally by causing the funnel-shaped container 17 to be rotated periodically in a counterclockwise direction (Figure 25), while the supporting disc 56 is being rotated in a clockwise direction. In other words, the series of pins 62, 61 and 60 serve to provide some compensation or correction for movement imparted to the container 17 by virtue of rotation of the supporting disc 56.

On the other hand, it is desired to dump the ground coffee (which has been used twice) from the container 18, and this is accomplished by the stationary pin 67 which serves to impart a clockwise movement to the container 18, i.e., to augment the clockwise movement imparted by virtue of rotation of disc 56. While the container 18 is in its "dumped" position illustrated in Figure 26, it is subjected to a stream of rinsing water directed up into the funnel-shaped container 18 by the rinsing nozzle 70 (Figure 5). After the container 18 has been dumped by its coaction with the stationary pin 67, the container 18 is moved to an upright position by coaction with the series of closely spaced pins 66, 65, 64 and 63, each of which imparts a rotation to the container 18 (i.e., a counterclockwise rotation) that is in opposition and overcompensates for the movement resulting from the clockwise direction of disc 56, so that at the end of a cycle represented by Figure 25F, both containers 17 and 18 are in vertically aligned position with the container 18 also in position to receive ground coffee from the chute 24 preparatory to the flow of hot water from the nozzle 20 (Figure 5).

As indicated previously, while the containers 17 and 18 undergo the motions represented in Figures 25A–25F, the containers 15 and 16, comprising the other container set 11, remain stationary and have, during at least part of that time, hot water flowing therethrough to produce a cup of coffee. After production of such cup of coffee, the other coffee set 12, comprising containers 17 and 18, is used, while the containers 15 and 16 undergo like movements described above in connection with Figures 25A–25F.

It would seem from the above that the ground coffee in any one particular container is used twice before being discarded, i.e., once when the container is in the uppermost position and a second time when the container is in the lowermost position. This means also that in the production of any one particular cup of coffee the ground coffee in the lower container has already been used once, is thus wet, and is in a more favorable condition for coffee extraction. In order to enhance a coffee extraction process, the hot water is allowed to remain in the lowermost container for a brief interval, as described later in connection with the movable stoppers associated with the lower ends of the lowermost containers.

While Figures 25A–25F thus represent movement imparted to the cups 17 and 18 during the time that the coffee is being dispensed using the other set 11, the related Figures 25G–25K illustrate subsequent movement of the cups 17 and 18, after a cup of coffee has been produced with water flowing through the containers 18 and 17 and during the time a subsequent cup of coffee is produced using the other container set 11.

It is noted that while the disc 56 is rotated in the counterclockwise direction, the disc 55, upon which the container set 11 is mounted, is rotated in the counterclockwise direction (Figure 5), but the same kind of movement of containers 15 and 16 is produced during such movement of disc 55. It is desirable that the discs 55 and 56 be rotated in opposite directions so that the rinse nozzles 70 and 71 may be located as shown as far away as possible from the containers in which the hot water is flowing, as well as from the conduit 26 (Figure 5), so as to minimize the possibility of the rinse water from splashing into the coffee which is being prepared.

*The mechanism for moving catcher or coffee outlet conduit 26*

As indicated previously, successive cups of coffee are produced using the container sets 11 and 12 alternately. The conduit 26 is positioned in corresponding alternate relationship to receive the coffee from container set 11 or container set 12, as the case may be, and the mechanism for accomplishing the same is shown in Figures 3, 5, 8, 22, 23 and 24.

This mechanism involves a pair of solenoids 90 and 91 which have their armatures connected by corresponding links 90L and 91L to diametrically opposite points on the gear 92 which is rotatably supported on the stationary frame member 93. Gear 92 meshes with the gear 94, mounted coaxially with the downwardly extending portion of the conduit 26. It is noted that the downwardly extending portion of conduit 26 telescopes within the spout 27 so that the conduit 26 may be easily removed for cleaning and servicing purposes by lifting it upwardly out of the spout 27, while at the same time unmeshing the gears 92 and 94. The operating solenoids 90 and 91 are alternately energized, as described later in connection with Figure 27, and, when energized, actuate a corresponding set of switches 90A, 90B, 90C and 91A, 91B, 91C. For this latter purpose, a pin 90P, 91P (Figures 22 and 8) is provided for operating the corresponding set of switches. Means are provided for disabling the catcher spout moving mechanism so that the catcher spout remains in its normal central position, Thus, when a dump cycle is initiated, the catcher spout remains in its central position and the hot water or coffee, as the case may be, is allowed to gravitate into the removable cabinet bin 10A which serves also as a collecting reservoir for rinse water and used coffee grounds. Preferably, the cabinet 10 is provided also with a glass front wall 10B, as shown in Figure 1, to allow a user to observe operations associated with the upper containers 15 and 17 only.

*Automatically positioned stopper associated with the lowermost ground coffee container of sets 11 and 12*

As indicated previously, it is desired that the hot water be retained for enhanced coffee extraction in the lowermost container of coffee set 11 or 12, as the case may be. This is accomplished by providing stoppers 100 and 101 (Figure 5) which are mounted on the shaft 103 (Figure 12), the shaft 103 being journalled for rotation in the spaced bearing members 104, 105 and 106. An arm 107 is attached to the shaft 103, and this arm is, in turn, connected through link 108 to the movable core of solenoid winding 109. This solenoid winding 109 is connected and operated as described later in connection with Figure 27. The stoppers 100 and 101 are normally held out of engagement with the lowermost containers by the prestressed coil tension spring 112 (Figure 8) which has one of its ends attached to a stationary support and the other one of its ends attached to the arm 107.

*Construction of containers*

Preferably, each container 15, 16, 17 and 18 is funnel-shaped and is constructed as illustrated in Figures 15 and 16 wherein the container 18 comprises an outer metallic funnel 18K having a spout 18L, an upper cylindrical portion 18M and an intermediate conical portion 18N. A conical screen 18P is coaxially disposed within and spaced from the conical portion 18N. For this purpose, the conical screen 18P has its peripheral edge bent radially outwardly and clamped between two rings 18R and 18S which are retained within the cylindrical portion 18M.

A shaft 18A is mounted by means of an outer strap 18V on the funnel 18K, with the axis of the shaft extending perpendicular to the axis of the funnel. The shaft 18T passes through the plate or disc 56 and is rotatably mounted thereon. A Geneva type of gear 18B is mounted on shaft 18A and cooperates with the series of stationary pins for producing movement of the container 18 with respect to the disc 56 when and as such disc 56 is rotated through the various positions illustrated in connection with Figures 25A–25K.

*Description of motor operated switches with reference to Figures 7, 11 and 18*

There are two driving motors provided, namely, the motor 11M with gear box 11X for moving the container set 11 by means of the corresponding so-called one-half revolution driven shaft 55A; and the motor 12M with gear box 12X for moving the container set 12 by means of the corresponding one-half revolution driven shaft 56A. The switches which are operated upon rotation of the shaft of motor 11M have the reference numeral 11 with a suitable letter appended thereto; and, similarly, the switches which are operated upon rotation of the shaft of motor 12M have the reference numeral 12 with a suitable like letter appended thereto.

The motor shaft 56A associated with the container set 12 drives a shaft 162 through meshing bevelled gears 163. The shaft 162 has mounted thereon five spaced switch actuating cams 164, 165, 166, 167, 168 (Figure 11). A like array of switch actuating cams for the same purpose are associated with the other motor 11M, as indicated in Figure 11, these cams, for convenience, being assigned the same reference numerals.

The cam 164 is a two-piece cam, as illustrated in connection with Figure 10, so as to allow adjustment of the time during which hot water is dispensed, such adjustment being indicated also in Figure 26 in connection with the double arrowed line associated with the radial line OE. Cam 164 operates a normally open switch 11A and a normally closed switch 11B. The terms normally open and normally closed have reference to the condition of the switch when the apparatus is in its at rest position, shown both in Figures 7 and 18. In this respect, all of the cams 164–168 comprise essentially circular discs with notches or grooves in the periphery thereof; and in the position illustrated in Figure 7, the actuating arms associated with each of the cams rests on the outer diameter of the discs (i.e., are not in the notches). The switch arms are allowed to move into the notches on the associated cam actuators during a brief interval in a cycle. While the cam 164 is referred to as the water dispensing cam, the cam 165 is referred to as the coffee feed cam, the cam 166 is referred to as the rinse cam, the cam 167 is referred to as the catcher spout cam and the cam 168 controls a holding switch in the dump relay circuit. The cam 165 operates the normally closed switch 12C, the cam 166 operates the normally open switch 11D, the cam 167 operates the normally open switch 11E and the cam 168 operates the normally closed switch 11F.

A change switch 11G, 12G (Figure 7) in the form of a microswitch of the single pole-double throw type is operated by a pin 160A on a shuttle bar 160. The shuttle bar 160 is slidably mounted on a pair of spaced pins 160B and 160C. The bar 160 is moved horizontally by a pin 140A or 141A, mounted, respectively, on discs 140 and 141 secured to the corresponding motor shafts 55A and 56A. By this means the switches 11G and 12G are operated at the end of a cycle so as to transfer control from one motor to the other. The disc 140 and 141 each has a pair of notches disposed 180 degrees apart in the periphery thereof for cooperation with the actuating arms of corresponding switches 11H, 11J and 12H, 12J. The switch 11H, 11J is actually a single pole-double throw switch, as shown in Figure 27, with the switch 11H being closed in the at rest position, illustrated in Figure 7. Likewise, the switch 12H, 12J is a single pole-double throw switch with the switch 12H being closed in the at rest position illustrated in Figure 7.

*Electrical control system in Figure 27*

The various relays, solenoids, motors and switches previously referred to are interconnected, as illustrated in Figure 27.

In Figure 27 the conditions represented therein correspond to those corresponding to Figure 7 wherein the transfer switch 11G, 12G is conditioned for rinsing of the container set 12 and to make coffee using container set 11. The actuating arms for switches 11H, 11J, 12H and 12J are at rest in corresponding grooves or notches in the motor operated cams 140 and 141. Also, it is understood that, as represented in Figure 18, all of the motor operated switches are in their actuated condition with the corresponding switch actuating arm at rest on the outside diameter of the associated motor operated cam.

In Figure 27 the apparatus is energized with an alternating current applied between the terminals 110, 111. A thermostatic switch 112 controls the heating current to the hot water heater coil 113. A lamp 114 illuminates the apparatus.

For purposes of convenience and simplification, the various relay windings have ascribed thereto different reference numerals, and the switches operated upon energization of the operating winding of the relay have the same reference numerals but with letters appended thereto.

Thus, the apparatus includes a vending relay which has an operating winding 120 and switches 120A, 120B and 120C that are operated upon energization of the winding 120. Similarly, a dump cycle relay has the winding 122 and associated switches 122A, 122B and 122C. The stopper relay has the energizing winding 123 and associated switches 123A and 123B.

The motors 11M and 12M serve, when energized, to produce operation of a series of switches. The switches which are operated by motor 11M have the reference numeral 11 with a characteristic letter appended thereto. Similarly, the switches which are operated upon operation of the motor 12M have the reference numeral 12 with like characteristic letters appended thereto.

The vending relay 120 is energized either upon depositing a coin or, alternatively, by operating a push-button switch 126. The vending relay coil 120 is connected between the power supply lines 110 and 111 through the normally open coin switch 125A. This switch 125A is closed by a coin, in which case the relay winding 120 is energized to in turn operate the associated relay switches, namely, the normally closed switch 120A, the normally open switch 120B and the normally open switch 120C.

Opening of switch 120A interrupts the flow of current to the coin blocking coil 121 which is serially connected between lines 110 and 111 through the normally open switches 11H, 12H and 120A. The coin blocking coil 121 operates a conventional arm associated in conventional manner in coin vending apparatus. Closing of the relay switch 120C provides a closed holding circuit for the relay coil 120 through a circuit which includes winding 120, switch 120C and switches 11H and 12H. Operation of the other normally open switch 120B provides an energizing circuit for either motor 11M or 12M, as the case may be, through a series circuit which includes the coin switch 125B, switch 120B, the single pole-double throw switch 11G, 12G and motors 11M and 12M. It is noted that the switches 11G and 12G are the so-called change switches and are operated by the motor operated shuttle bar (Figure 7). As illustrated in Figure 7, switch 12G is closed and 11G is open, in which case at this particular time, the motor 12M is energized upon previously described energization of the vending relay winding 120. Thus, the motor 12M starts a cycle of operation corresponding to a 180 degree rotation of the motor driven shaft 56A (Figure 7), in which case the series of switches characterized by the reference numeral 12 with characterizing letter appended thereto are actuated. The operation of the switches is timed generally as indicated in connection with Figure 26, in which the radial line OA represents the at rest condition illustrated in Figure 7. The line OB represents a subsequent condition corresponding to the initial 5 degree rotation of shaft 56A. During such 5 degree rotation of shaft 56A, none of the switches are operated and this so-called dead zone of 5 degrees is to allow for mechanical considerations. During the subsequent interval represented by the 18 degree space between the radial lines OB and OC, coffee from the coffee hopper 24 is fed into the upper container 17. While the coffee is being dispensed into such container, hot water is allowed to flow during a portion of the coffee feeding interval represented by the 18 degree space in Figure 26. Thus, the hot water begins to flow at the time represented by the radial line OD and, as illustrated, continues during the subsequent 90 degree rotation of the motor driven shaft to the time indicated by the radial line OE. It is noted that an 18 degree rotation of the motor driven shaft corresponds to one second, so that as illustrated in Figure 26, hot water is allowed to flow for four and one-half seconds. The time interval during which hot water flow occurs is adjustable as indicated by the double arrowed line 150. The maximum adjustment is five seconds corresponding to the maximum water adjustment line OF.

As noted above, while one container set is being used in making coffee, the lower container of the other container set is being dumped and rinsed. Such rinsing, as illustrated in Figure 26, occurs after the cessation of the flow of hot water used in making coffee so as to minimize pressure variations in the hot and cold water supply. Thus, the rinsing cycle commences a period after the time represented by the line OF and lasts for a time of approximately one and one-half seconds, as represented by the line OG. At a subsequent time represented by the line OH, the coffee collecting or catcher spout is in a position to catch the prepared coffee which at this time is allowed to gravitate from the bottom container. The flow of coffee then occurs during the interval represented from the line OH to the line OL. The line OM represents the time of dumping during a dump cycle (when used), as described in detail later.

This timing described in connection with Figure 26 is accomplished using the circuitry illustrated now in detail in connection with Figure 27. Thus, the motor 12M has its output set into rotation upon energization of the vending relay winding 120, and such rotation continues for about 5 degrees, at which time coffee is dispensed.

Specifically, the coffee solenoid 34 is energized through the motor operated switch 12C to thereby dispense a predetermined amount of coffee. While the coffee is being dispensed, the water cam switches 12A, 12B and 12C are operated. The motor operated switch 12A energizes the hot water solenoid 50 so as to dispense the hot water. Switch 12B opens and switch 12P closes to thereby energize the stopper relay 123 through normally closed dump relay switch 122D for purposes of preventing or stopping the flow of water through the lower container. Specifically, energization of winding 123 causes operation of switches 123A and 123B. Switch 123A closes to provide a holding circuit for relay winding 123; and closing of switch 123B results in energization of the stopper solenoid 109. After the hot water has been dispensed, a rinse cycle is initiated (with respect to the lower container of the other container set 11) upon closure of the motor operated switch 12D which is in series with the rinse solenoid winding 70A. It is noted that normally the coffee catcher spout or coffee collecting conduit 26 is maintained in a central position, as illustrated in Figure 5, and also during rinsing. In order to move the catcher or coffee collecting spout 26 so as to receive coffee from the container set 11 or 12, as the case may be, the corresponding catcher solenoid 90 or 91 is required to be energized. The energizing circuit for the catcher solenoid 91 includes the catcher solenoid 91, the motor operated switch 12E, the normally closed switch 122C, and the timer switch 128A associated with the timing motor 128. Thus, upon closure of switch 12E, an energizing current for the solenoid winding 91 flows through this circuit.

The energization of catcher solenoid 90 results not only in movement of the catcher spout 26 (Figure 5) to a position underneath the lowermost container 16, but also results in operation of a series of switches of the character illustrated in Figure 8 (the switch shown there being associated with the companion solenoid 91). The switches operated upon energization of the catcher solenoid 91 include the two normally open switches 91A, 91B and the normally closed switch 91C. Likewise, the switches operated by the catcher solenoid 90 include the two normally open switches 90A, 90B and the normally closed switch 90C.

Thus, when solenoid winding 91 is energized as previously described, switches 91A, 91B are closed and switch 91C is opened. Closure of switch 91A provides a holding circuit for the winding 91, such circuit including the switch 11B, switch 91A, winding 91 and the normally closed timer switch 128A. Closure of switch 91B results in energization of the timing motor 128 through a circuit which includes switch 11B, switch 91B and the timing motor 128. Opening of the switch 91C causes the stopper solenoid winding to be deenergized. The timing motor 128 runs for a predetermined interval after its energization, after which its associated switch 128A is caused to be opened to thereby deenergize the catcher solenoid winding 91.

It is observed that the stopper solenoid 109, when energized, serves to place the stopper 100 (Figure 5) adjacent the lowermost containers to prevent or stop the flow of liquid. The stopper solenoid 109 is energized through a circuit which includes the stopper relay switch 123B, the catcher solenoid switch 91C and the catcher solenoid switch 90C. The stopper relay 123 is energized initially through a series circuit which includes the switch 12B, relay switch 122D and the relay winding 123. After such energization, the relay winding 123 remains energized through a holding circuit which includes the switches 11F, 12F, 123A, 122D and relay winding 123.

Provisions are also incorporated to allow the machine to go through a cycle of operation without, however, the coffee being dispensed out of the catcher spout, the finished coffee in such case being allowed to gravitate directly into the receptacle provided at the bottom of the machine. This provision is desirable to, first, condition the machine for subsequent operation as described above, and, secondly, to allow the operator to get rid of unused coffee grounds. These provisions involve initiation of a so-called dump cycle. Such cycle is initiated by closing the push-button switch 127, in which case the dump cycle relay winding 122 is energized through a circuit which includes the switches 11H, 12H, 120A, 127 and the winding 122. Energization of winding 122 results in operation of the associated switches 122A, 122B and 122C. The closing of the switch 122A results in establishment of a holding circuit for winding 122 which includes switches 11F, 12F, 122A and the winding 122. Closure of switch 122B provides an energizing circuit for either motor 11M or 12M, as the case may be, through a circuit which includes switch 122B, either switch 11G or 12G, as the case may be, depending upon the position of the shuttle bar 160 (Figure 7), and the corresponding motor 11M or 12M. Opening of the switch 122C prevents the stopper relay winding 123 from being energized, it being noted that the normally closed switch 122D is in series with such winding 123 so that the fluid is allowed to flow directly through the lower container without being impeded by stoppers.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:

1. In apparatus of the character described, two sets of containers, each set of containers comprising a pair of containers arranged so that liquid introduced into one of said pair may flow from the same and to and through the other one of said pair of containers, means for alternately moving one set with respect to the other set such that the order of flow of liquid through the containers of said one set, thus moved, may be reversed, means for cleaning said one set of containers while it is being moved, and means for preparing a beverage in the other set of containers while said one set is being moved, and common drive means synchronously operating each of the aforementioned means.

2. In apparatus of the character described for preparing coffee, an upper container, a lower container having prewetted undisturbed coffee material therein arranged so that liquid introduced into the upper container flows through the same and into and through the lower container, each of said containers incorporating means through which liquid initially introduced into the upper container filters first through the coffee material in the upper container and then through the undisturbed prewetted coffee material in the second container, means for interchanging the positions of said containers, means for dispensing fresh ground coffee material into the upper container, means for dispensing liquid through said upper container so as to wet the material therein and thereafter to flow through previously wetted coffee material in the lower container, the first mentioned means incorporating means whereby the wetted material in said upper container is not appreciably disturbed in its travel from an upper position to a lower position, and the first mentioned means incorporating means for dumping the wetted material from the lower container prior to completion of its movement from its lower position to its upper position, and common drive means synchronously operating each of the aforementioned means.

3. Apparatus as set forth in claim 2 including stopper means effective, when operated, to prevent the flow of hot water from said lower container during operation of said dispensing means, said stopper means being operated synchronously with said common drive means.

4. In apparatus of the character described, two sets of containers, each set of containers comprising an upper container and a lower container arranged so that liquid introduced into said upper container may flow from the same and to and through said lower container, means for alternately moving the sets of containers with one set being stationary while the other set is being interchanged in such a manner that an upper container of said other set is moved to a lower position and the lower container of said other set is simultaneously moved to an upper position, and means including said stationary containers for preparing a beverage while said other set is thus being moved, and a common drive means synchronously operating each of the aforementioned means.

5. In apparatus of the character described, a pair of sets of coffee containers alternately effective to prepare successive cups of coffee, the containers of a set being arranged so that liquid introduced into one of the containers of a set flows to and through the other container of the same set, means for reversing the positions of said one and said other containers of the same set so that flow of liquid through the same may be in a different order and a coffee catcher spout, and means moving said catcher spout alternately in cooperating relationship with that particular set which is effective to prepare a cup of coffee, and common drive means synchronously operating each of the aforementioned means as well as said spout.

6. Apparatus as set forth in claim 5 including means for disabling said moving means.

7. In apparatus of the character described for preparing coffee, the subcombination comprising storage means for ground coffee; ground coffee feed means; hot water feed means; an upper and a lower ground coffee container each containing ground coffee through which hot water is allowed to gravitate, in turn in that order; means for operating said coffee feed means to dispense ground coffee from said storage means into said upper container; means for operating said water feed means after said upper container is filled with ground coffee from said storage means; means for interchanging the positions of said containers so that the order in which hot water may flow through the same is reversed; and stopper means associated with the lower container and automatically and synchronously operated with said water feed means for arresting the flow of hot water through said lower container for a predetermined time interval to obtain enhanced coffee extraction from prewetted coffee grounds in said lower container, and common drive means synchronously operating each of the aforementiond means.

8. An arrangement as set forth in claim 7 including means automatically operated by said common drive means for disabling said stopper means after said predetermined time interval.

9. In apparatus of the character described for preparing coffee, ground coffee dispensing means, a pair of coffee containers, each of said containers incorporating means through which hot water initially introduced into the upper container filters first through the ground coffee in the upper container and then through the undisturbed prewetted ground coffee in the lower container, means for moving said containers successively from a lower position to an upper position to position successive ones of said containers in said upper position to receive ground coffee from said dispensing means, means rendering said dispensing means effective to dispense ground coffee into one of said containers, means producing a flow of hot water through said one container with ground coffee dispensed therein, said hot water being allowed to gravitate from said one container into the other of said pair of containers containing ground coffee which was previously wetted when said other container was formerly in said upper position, and means incorporated in said moving means for maintaining said containers in their upright position in movement from said upper position to said lower position so as not to disturb appreciably the wetted ground coffee therein, means for dumping the ground coffee from said lower container prior to completion of its movement from its lower position to its upper position, and means synchronously operating each of the aforementioned means.

10. In apparatus of the character described for preparing coffee, ground coffee dispensing means, a pair of coffee containers, means for moving said containers successively from a lower position to an upper position to position successive ones of said containers in said upper position to receive ground coffee from said dispensing means, means rendering said dispensing means effective to dispense ground coffee into one of said containers, means producing a flow of hot water through said one container with ground coffee dispensed therein, said hot water being allowed to gravitate from said one container into the other of said pair of containers containing ground coffee which was previously wetted when said other container was formerly in said upper position, and means incorporated in said moving means for maintaining said containers in their upright position in movement from said upper position to said lower position so as not to disturb appreciably the wetted ground coffee therein, stopper means associated with the lower container automatically and synchronously operated with said flow producing means for maintaining the hot water in the lower container for an appreciable time interval for enhanced coffee extraction, and means automatically operated after said predetermined time interval for disabling said stopper means to permit flow through said lower container.

11. In apparatus of the character described for preparing coffee, an upper container, a lower container arranged so that liquid introduced into the upper container flows through the same and into and through the lower container, means for interchanging the positions of said containers so that the order of liquid flow through the same may be reversed, said means incorporating means for maintaining said upper container in a substantially upright position during its movement from an upper position to a lower position and incorporating means for substantially inverting the lower container prior to completion of its movement from its lower position to its upper position, common drive means synchronously operating each of the aforementioned means, and stopper means effective, when operated, to prevent the flow of hot water from said lower container during operation of said dispensing means, said stopper means being operated synchronously with said common drive means.

References Cited in the file of this patent

UNITED STATES PATENTS

| | | |
|---|---|---|
| 532,522 | Blakeslee | Jan. 15, 1895 |
| 617,322 | Duke | Jan. 10, 1899 |
| 1,496,806 | Bossi | June 10, 1924 |
| 1,551,855 | Svendsgaard | Sept. 1, 1925 |
| 1,630,676 | Smith | May 31, 1927 |
| 1,716,266 | Flamm | June 4, 1929 |
| 1,804,795 | Lee | May 12, 1931 |
| 1,813,872 | Bausman | July 7, 1931 |
| 1,953,291 | De Vry | Apr. 3, 1934 |
| 1,993,609 | Kennedy | Mar. 5, 1935 |
| 2,057,430 | Herrera | Oct. 13, 1936 |
| 2,263,610 | Cain | Nov. 26, 1941 |
| 2,315,777 | Denton | Apr. 6, 1943 |
| 2,338,140 | States | Jan. 4, 1944 |
| 2,433,054 | Lime | Dec. 23, 1947 |
| 2,592,761 | Svendsgaard | Apr. 15, 1952 |
| 2,666,379 | Kaminky | Jan. 19, 1954 |

FOREIGN PATENTS

| | | |
|---|---|---|
| 9,377 | Great Britain | 1892 |
| 548,160 | France | Oct. 13, 1922 |
| 451,476 | Great Britaiin | Aug. 6, 1936 |